M. BALES.
Mole-Plow.
No. 248. A. I. Patented Aug. 23, 1859.
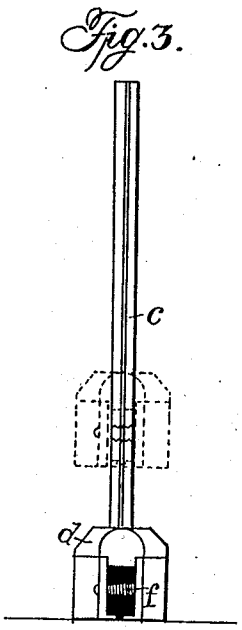
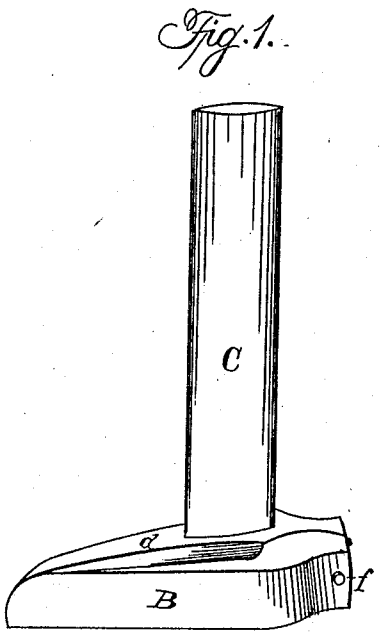
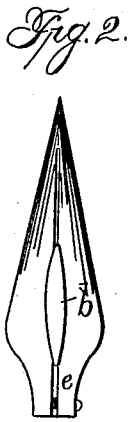
Witnesses:
H. C. Clifton
Y. A. McDowell
Inventor:
Moses Bales
N. PETERS, PHOTO-LITHOGRAPHER, WASHINGTON, D. C.

UNITED STATES PATENT OFFICE.

MOSES BALES, OF BIG PLAIN, OHIO.

IMPROVEMENT IN MOLE-PLOWS.

Specification forming part of Letters Patent No. 22,928, dated February 15, 1859; Additional Improvement No. 248, dated August 23, 1859.

*To all whom it may concern:*

Be it known that I, MOSES BALES, of Big Plain, in the county of Madison and State of Ohio, have invented a new and useful Improvement in Mole-Plows; and I do hereby declare that the following is a full and clear description thereof, reference being had to the accompanying drawings, and to the letters of reference marked thereon and made to form a part of this specification.

My invention is an improvement upon the patent granted me for mole-plows February 15, 1859; and it consists in the employment of a tapering wedge-shaped cap arranged in such manner as to be adjustable with and to form a part of the mole, as hereinafter described and represented.

In reference to the accompanying drawings, Figure 1 is a side view, Fig. 2 a bottom view, and Fig. 3 an end view, of the improved mole.

C is the cutting-shaft.

B is the body of the mole, formed with an opening, *b*, in its bottom, as shown clearly in Fig. 2, and having slots *e* forward and in rear of said opening *b*, so that by means of the screw *f* the mole B may be contracted in such manner as to secure it rigidly upon the shaft C.

*d* is a cap formed to fit within the mole B in such manner as to be firmly secured by the contraction thereof, and having shoulders which project over the upper edges of said mole B, so as to be flush with the outer face thereof, as clearly shown in Fig. 1, and formed tapering from its heel to its point, in order to secure sufficient upward pressure upon the soil or earth, as the mole is made to operate in the formation of drains. The shaft C passes through and fits closely within an opening of the cap *d*, so that when the mole B is adjusted for use the cap *d* forms a part of the mole and affords strength and support to it.

The operation of the above-described improved mole is substantially the same as that described in my aforesaid original patent, and the advantages secured by means of the improvement are securing the mole more rigidly to the shaft and a more perfect compression of the earth at the top of the drain than can be secured by means of the mole described in my aforesaid patent.

Having described my improvement, what I claim as new, and desire to secure by Letters Patent, is—

The employment of the cap *d* in combination with the mole B, constructed and arranged substantially as and for the purposes set forth.

In testimony of which invention I have hereunto set my hand.

MOSES BALES.

Witnesses:

H. E. CLIFTON,

F. A. MCDOWELL.